Figure 1:
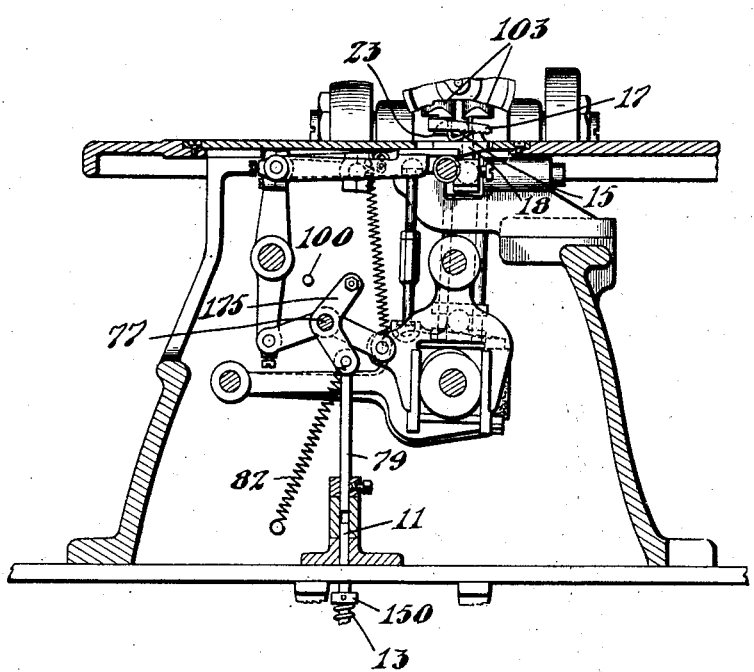

May 7, 1929.　　F. RICKS ET AL　　1,711,618
EDGE FINISHING MACHINE
Filed April 26, 1927　　2 Sheets-Sheet 1

INVENTORS.
Fred Ricks
Alfred E. Richards
By their Attorney
Nelson N. Howard

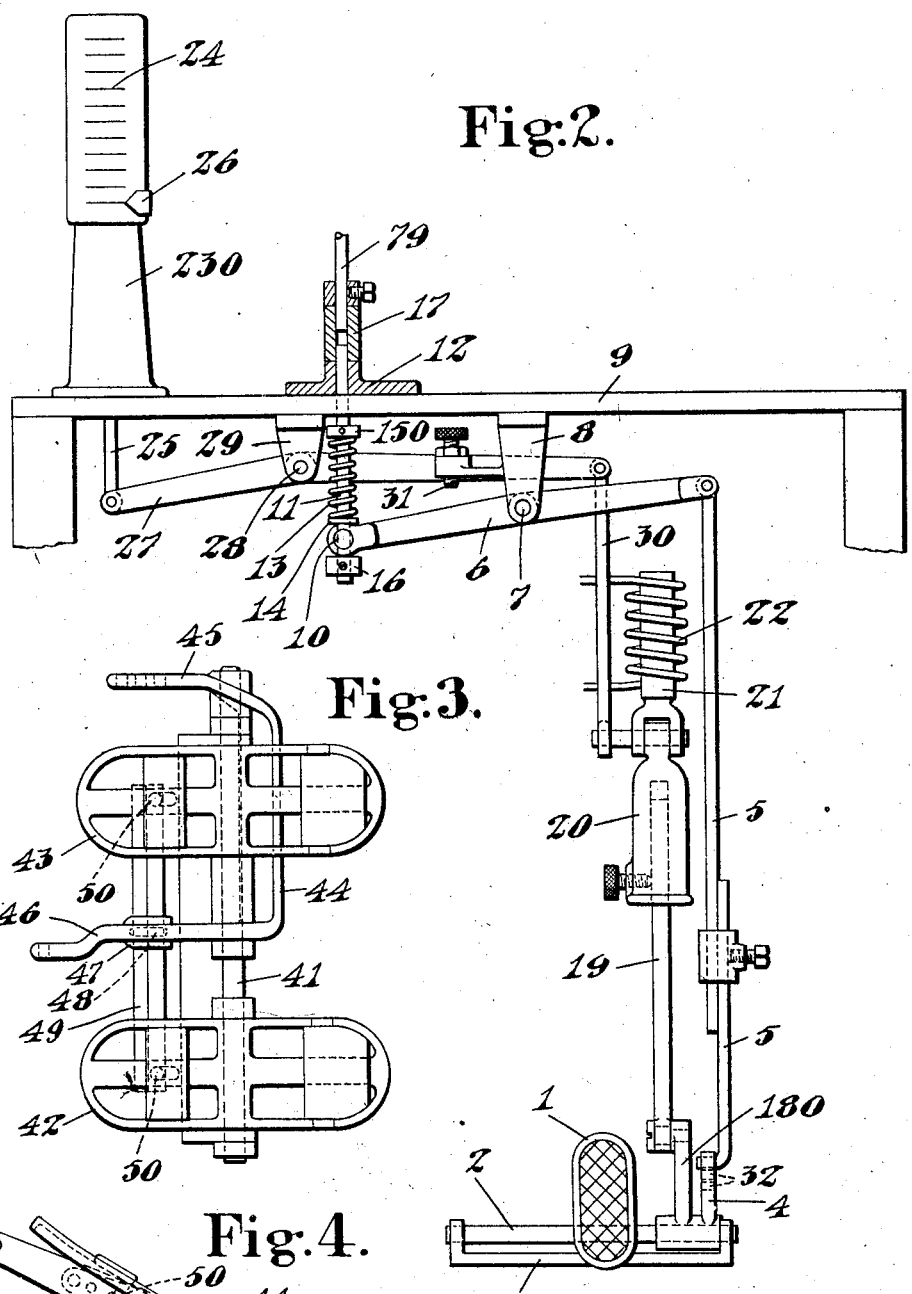

Patented May 7, 1929.

1,711,618

UNITED STATES PATENT OFFICE.

FRED RICKS AND ALFRED EDWARD RICHARDS, OF LEICESTER, ENGLAND, ASSIGNORS TO UNITED SHOE MACHINERY CORPORATION, OF PATERSON, NEW JERSEY, A CORPORATION OF NEW JERSEY.

EDGE-FINISHING MACHINE.

Application filed April 26, 1927, Serial No. 186,697, and in Great Britain May 29, 1926.

This invention relates to machines for finishing the edges of pieces of sheet material and is herein illustrated as embodied in a machine designed particularly for use in finishing the edges of pieces of upper leather preparatory to their incorporation in boots and shoes, a machine of this general type being shown in Patent No. 1,599,518 granted Sept. 14, 1926 upon application of Joseph Fossa. In that machine the leather is fed, grain side downward, in such manner that a narrow margin of the leather passes beneath a hot shrinkage or searing tool whereby the margin on the flesh side is shrunk and the unshrunken margin on the grain side curls toward the flesh side to present an edge which is all grain.

In machines of this general type it is desirable that, when the rate of feed of the work past the shrinking tool is varied, the temperature of the tool should also be varied since, in general, if the temperature of the tool is sufficient properly to shrink the work when the work is being fed at a low rate of feed, the same temperature will not be sufficient when the rate of feed is increased. To this end machines of the type referred to have been provided with treadle controlled means for simultaneously varying the rate of feed of the work and the heat supplied to the tool.

Not only is the simultaneous control, which has been referred to above, desirable but it is also desirable that at some rates of feed, the supply of heat to the tool be varied without changing the rate of feed. For example, when the rate of feed is at its minimum, it is desirable to be able to vary the supply of heat without varying the rate of feed so that relatively thick pieces of work, which, nevertheless, differ somewhat in thickness, may be treated at the proper temperature. Or again, when relatively thin pieces of work which may be fed at the maximum rate of feed, are being treated, it is desirable to be able to vary the supply of heat in accordance with variations in the thickness of these relatively thin pieces.

In the illustrated embodiment of the present invention a single member is provided for controlling both the supply of heat to the tool and the rate of feed of the work, the construction being such that movement of the member through one portion of its path simultaneously varies the supply of heat and the rate of feed and through another portion of its path varies the supply of heat while the rate of feed remains unchanged. In the illustrated machine the tool is heated by an electric current, the flow of electricity being controlled by moving a core more or less into or out of a choke coil, while the rate of feed of the work is controlled by a lever which may be swung in one direction to increase the rate of feed and in the opposite direction to decrease said rate, the lever being adapted to contact with a stop when swung into position to produce maximum feed. In order to control both the temperature of the tool and the rate of feed of the work, a treadle is so connected both with the core of the choke coil and with the controlling lever of the feed mechanism that depression of the treadle through the first part of its path of movement increases the supply of heat without changing the rate of feed; then, as the treadle is further depressed, the supply of heat and the rate of feed are simultaneously increased; and, during the last part of the depression of the treadle, the feed remains at maximum and the supply of heat continues to be increased.

This and other features of the invention will be described as embodied in an illustrated machine and pointed out in the appended claims.

Referring now to the accompanying drawings,

Fig. 1 is an end view principally in elevation of a machine in which the present invention is embodied, Fig. 2 is a front elevation, partly in section of one form of treadle-operated mechanism for controlling the feed of the work and the temperature of the tool, Fig. 3 is a modified form of treadle mechanism in which two treadles are employed, and Fig. 4 is an end elevation of the treadle mechanism shown in Fig. 3.

The machine shown in Fig. 1 is of the type disclosed in the Letters Patent referred to, to which reference may be had for more detailed disclosure of the construction and operation of parts not fully described herein. The work, such as a piece of shoe upper leather, is fed from right to left as viewed in Fig. 1 in such manner as to cause its margin to pass beneath a hot shrinking tool 15 whereby the margin of the work is curled in the manner which has been referred to above; and, as the work passes from beneath the shrinking tool, it is struck by a hammer 23 which tends to increase the curl of the margin. The tool is made of some highly refractory material, as illustrated, of an alloy of nickel and chromium. It is substantially U-shaped, and its upright ends are connected with the terminals 103 of an electric circuit whereby it may be heated. The work is fed intermittently by feed members 17, 18, and the rate of feed may be varied by swinging the bent lever 175 about its pivot 77. When the upper arm of the bent lever 175 is in the inclined position shown, in which it normally is held by the spring 82, the feed of the work is at a minimum. When the rod 79 is pushed up to swing the upper arm into an upright position, the feed of the work is at a maximum, the feed increasing as the lever is swung. In order to arrest the movement of the lever when maximum feed is reached, a stop 100 is provided. The machine, as briefly described above, is like that disclosed in the above mentioned Letters Patent except that in the patented machine the lever which corresponds to the lever 175 is of slightly different shape and its upper arm is normally held upright by the spring 82 so that the feed is normally at a maximum and may be reduced to a minimum by pushing up the rod 79 and swinging the bent lever to bring its upper arm into a position inclined to the vertical.

The mechanism for controlling both the rate of feed of the work and the supply of heat to the tool will now be described. Referring more particularly to Fig. 2, a treadle 1 is fixed on a shaft 2 rotatably mounted in a bracket 3 fixed to the floor. The shaft 2 has fixed to it an arm 4 to which is pivotally connected a two-part rod 5 the upper end of which is pivotally connected to one arm of a lever 6. The lever 6 is pivoted at 7 to a bracket 8 fixed to the underside of the work-bench 9 on which the machine rests. The other end of the lever 6 is forked and has rotatably mounted in it a pin 10 extending across the fork. Slidingly mounted in the pin 10 is a rod 11 which extends upwardly through the work-bench 9 and is slidingly mounted in a bearing 12 formed on the base of the machine. Surrounding the rod 11 is a spring 13 the lower end of which bears on a washer 14 on the top of the fork and the upper end of which bears against a collar 150 on the rod. A collar 16 fixed on the rod 11 beneath the fork engages the fork to limit the upward movement of the rod under the influence of the spring. The rod 11 at its upper end enters the bearing 17 which, in the machine shown in the aforementioned patent, guides the lower end of the rod 79 which controls the feed mechanism of the machine. As has been explained above, pushing up the rod 79, increases the rate of the feed. When, therefore, the treadle is depressed, the lower rod 11 is moved up until it engages the lower end of the upper rod 79, and thereafter continued depression of the treadle increases the rate of the feed. The treadle 1 is held up by a spring (not shown), and, when the treadle is in normal fully raised position, the upper end of the lower rod 11 is somewhat below the lower end of the upper rod 79 so that, for a purpose hereinafter described, there is a lost motion between the two rods.

The treadle shaft 2 has fixed on it a second arm 180 to the free end of which is pivotally connected a rod 19. The rod 19 has adjustably fixed to its upper end a member 20 which is pivotally connected to a core 21 normally encircled by a choke coil 22 through which electric current passes to the searing tool of the machine. Depression of the treadle 1 draws down the core 21 to reduce the choking effect and thereby increases the current passing to the tool and consequently increases the heat of the tool. An indicator is provided whereby the operator can gauge the heat of the tool. The indicator is fixed on the work-bench 9 and comprises a bracket 230 having an indicating scale 24 on it and a vertical rod 25 slidingly mounted in the bracket and carrying a pointer 26 which travels over the scale. The rod 25 at its lower end is connected to one arm of a lever 27 which is pivoted at 28 to a bracket 29 fixed to the underside of the work-bench 9. The other arm of the lever 27 is connected by a rod 30 to the core 21 in the choke coil 22.

When power is applied to the machine and current is passing through the choke coil 22 to the tool and the treadle 1 is in normal fully raised position, the feed mechanism of the machine is operating to feed the work at a low speed and the tool is heated to a low temperature. During the operation of the machine the operator depresses the treadle and draws down the core 21 in the choke coil to increase the current passing to the tool and to raise its temperature. Owing to the lost motion between the upper and lower ends of the rods 11 and 79 associated with the feed mechanism, the first part of the depression of the treadle has no effect on the feed mechanism which continues to feed the work at the lowest speed, but is used to increase the temperature of the tool to suit the thickness or character of the material. During continued depression of the treadle the ends of the rods 11, 79 engage, the feed is increased and, at the same time, the core 21 in the choke coil is pulled farther out of the coil and the temperature of the tool is increased. When the feed reaches its maximum, upward movement of the rods 11, 79 is arrested by the stop 100 in the feed mechanism which may be adjustable so as to determine the maximum amount of feed. The spring 13 on the rod 11 then permits still further depression of the treadle to increase the temperature of the tool as may be required.

It will therefore be seen that from a condition of the machine, in which the feed mechanism is operating to feed the work, at its lowest rate, the temperature of the tool may be raised by a partial depression of the treadle without altering the rate of feed; the temperature of the tool may be further increased and the rate of the feed increased correspondingly by further depression of the treadle, and, by a still further depression, the temperature of the tool may be still further increased after the feed mechanism has reached its maximum speed.

An adjustable stop 31 is provided to limit the final depression of the treadle so as to prevent damage to the tool by overheating. The temperature of the tool at the commencement, and consequently at various positions of the treadle, may be determined by initial adjustment of the core 21 in the choke-coil 22 by adjusting the member 20 vertically upon the treadle rod 19; and, by positioning the lower end of the treadle rod 5, which connects the treadle to the feed mechanism, in one or other of a series of holes 32 in the arm 4 on the treadle shaft so as to bring the lower end of the rod 5 nearer to or farther from the shaft 2 the ratio between the increase of heat and increase in the rate of feed may be varied.

In Figures 3 and 4 the single treadle of the construction of Fig. 2 is shown replaced by a compound treadle arrangement which comprises a bracket 40, fixed to the floor, having fixed in it a shaft 41 on which are pivotally mounted two treadles 42, 43. Also pivotally mounted on the shaft 41 is a lever 44 having arms 45, 46. The arm 45 has connected to it the lower end of the rod 5 shown in Fig. 1 and the arm 46 has connected to it the rod 19 shown in Fig. 1. The arm 46 has formed on it a fork 47 in which is pivoted, on a pin 48, a lever 49 the ends of which extend beneath the treadles and carry pins 50, 50 which bear against the under side of the treadles. With this arrangement both feet of the operator are used to swing the lever 44 to control the feed rate and heat. The treadles are held normally by springs (not shown) in the positions shown with their toe portions raised and their heel portions resting upon the floor, the connections to the rods 5 and 19 being such that when both treadles are depressed about half way both the rate of feed of the work and the supply of heat to the tool are at maximum. When it is desired to reduce the supply of heat or simultaneously to reduce the rate of feed, the toe end of one of the treadles is allowed to rise somewhat. By thus manipulating one of the treadles while the other is held stationary, the treadle which is being moved can be moved a considerable distance without causing any great movement of the rods 5 and 19—or at least not nearly so much movement of the two rods as in the case where a single treadle, such as the treadle 1, is provided. Consequently, by means of the two treadles, the operator is enabled to obtain an easier and more sensitive control of the rate of feed and the supply of heat. Although a particular mode of operation of the two treadles, in which one is held stationary while the other is moved, has been described in order to explain why two treadles are provided, it is obvious the treadles may be moved at the same time in the same or in opposite directions at the convenience of the operator.

Having thus described the invention, what we claim as new and desire to secure by Letters Patent of the United States is:

1. A machine of the class described, having in combination, a heated tool, means for feeding the work past the tool, and a single member, movement of which through one portion of its path simultaneously varies the temperature of the tool and the rate at which the feed mechanism feeds the work and through another portion of its path varies the temperature of the tool while the rate of feed of the work remains unchanged.

2. A machine of the class described, having, in combination, a heated tool, means for varying the supply of heat to the tool, mechanism for feeding the material past the tool, means for varying the rate of feed and means under the control of the operator and operable either to cause the supply of heat and the rate of feed to be simultaneously varied or to cause the supply of heat to be varied while the rate of feed remains unchanged.

3. A machine of the class described, having, in combination, a heated tool, means for varying the supply of heat to the tool, mechanism for feeding the material past the tool, means for varying the rate of feed and a single member, movement of which through one portion of its path varies simultaneously the supply of heat and the rate of feed and through another portion of its path varies the supply of heat while the rate of feed remains unchanged.

4. A machine for finishing the edge of a piece of sheet material having, in combination, a heated shrinking tool, means for varying the supply of heat to the tool, mechanism for feeding the material past the tool, means for varying the rate of feed, and a single operator-controlled member, movement of which through one portion of its path varies simultaneously the supply of heat and the rate of feed and through another portion of its path varies the supply of heat while the rate of feed remains unchanged.

5. A machine for finishing the edge of a piece of sheet material, having in combination, a heated shrinking tool, means for varying the supply of heat to the tool, mechanism for feeding the material past the tool, means for varying the rate of feed, a single operator-controlled member, and means responsive to movement of said member for first increasing the supply of heat and then simultaneously increasing both the supply of heat and the rate of feed.

6. A machine for finishing the edge of a piece of sheet material, having in combination, a heated shrinking tool, means for varying the supply of heat to the tool, mechanism for feeding the material past the tool, a feed controlling member, movement of which varies the rate of feed, a treadle, a lost-motion connection between the treadle and the feed-controlling member, and a direct connection between the treadle and the means for varying the supply of heat to the tool.

7. A machine for finishing the edge of a piece of sheet material, having in combination, a heated shrinking tool, means for varying the supply of heat to the tool, mechanism for feeding the material past the tool, said mechanism being normally adapted to feed the material at a low rate of speed, a feed-controlling member, movement of which increases the rate of feed, a stop for said member, a treadle, a lost-motion connection between the treadle and the feed-controlling member, and a direct connection between the treadle and the means for varying the supply of heat to the tool whereby manipulation of the treadle acts, first, to increase the supply of heat to the tool while the rate of feed of the work remains unchanged and then to increase simultaneously the supply of heat and the rate of feed, until the feed-controlling member contacts with the stop, and thereafter to increase the supply of heat while the rate of feed remains unchanged.

8. A machine for finishing the edge of a piece of sheet material, having in combination, a heated shrinking tool, means including an electric circuit for heating the tool, a choke coil in the circuit and a core movable into and out of the coil to vary the amount of current supplied to the tool, mechanism for feeding the work past the tool, means for varying the rate of feed, and a controller connected directly to the core and through a lost-motion connection to the feed varying means.

9. A machine for finishing the edge of a piece of sheet material, having in combination, a heated shrinking tool, means for varying the supply of heat to the tool, mechanism for feeding the material past the tool, means for varying the rate of feed, a single operator-controlled member movement of which varies both the supply of heat and the rate of feed, and two treadles for moving said member.

In testimony whereof we have signed our names.

FRED RICKS.
ALFRED EDWARD RICHARDS.